Sept. 21, 1965  L. BOTWIN  3,208,037
SONAR TRANSDUCER
Filed Nov. 3, 1960  2 Sheets-Sheet 1

INVENTOR.
LEO BOTWIN
BY
Henry L. Steuer
ATTORNEY

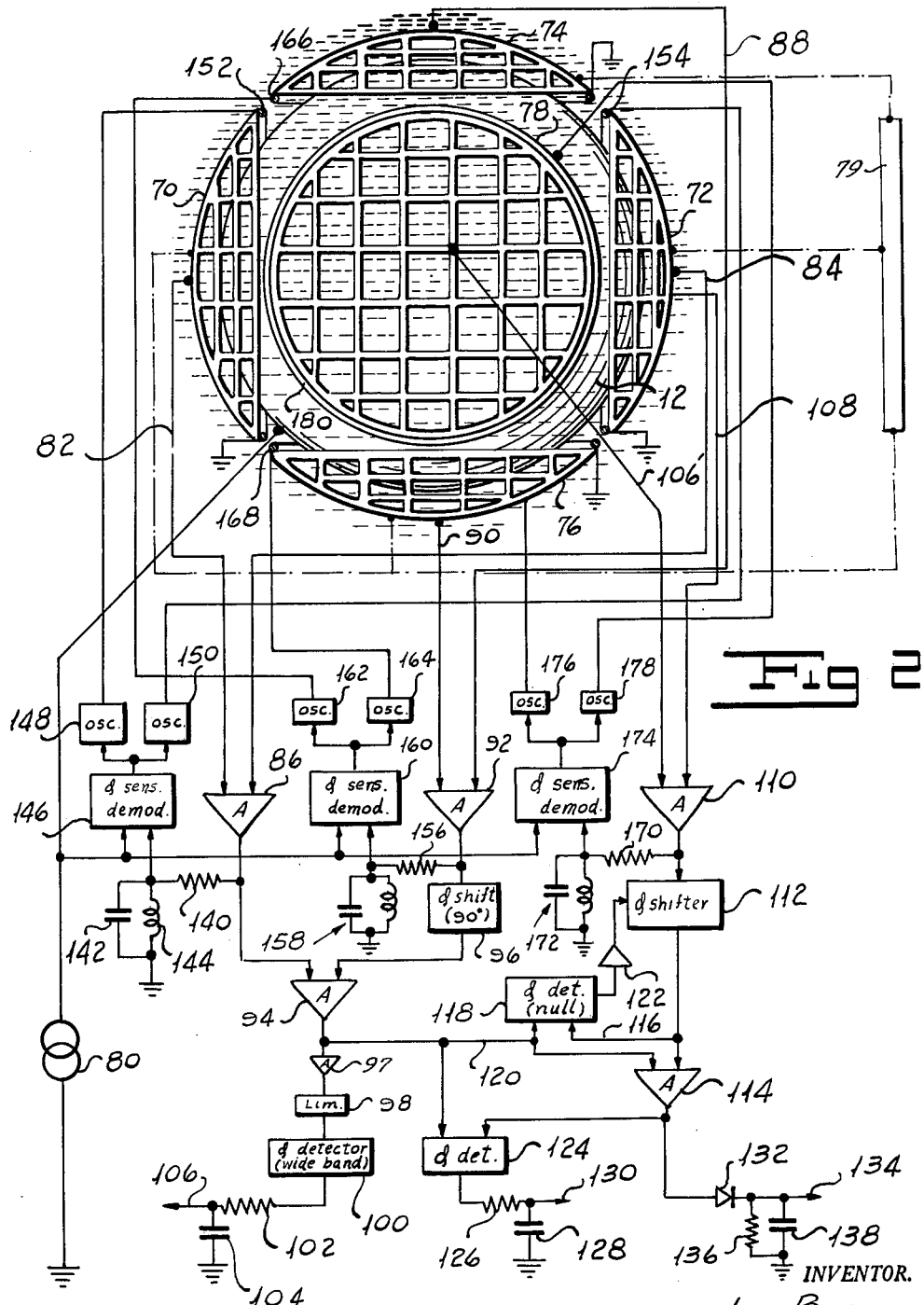

United States Patent Office 3,208,037
Patented Sept. 21, 1965

3,208,037
SONAR TRANSDUCER
Leo Botwin, Port Chester, N.Y., assignor to United Aircraft Corporation, East Hartford, Conn., a corporation of Delaware
Filed Nov. 3, 1960, Ser. No. 66,951
10 Claims. (Cl. 340—8)

My invention relates to a sonar transducer and more particularly to an improved device for detecting acoustical disturbances in liquids which is more sensitive than are detecting devices of the prior art.

There are known in the prior art many devices for detecting the presence of an acoustical disturbance in a liquid such as water. One use for these devices is to detect the presence of a submarine or the like in the area at which the detector is installed. These devices of the prior art rely on the variation in acoustical pressure to cause them to produce their output signal. In the course of their operation, owing to the fact that they do depend upon changes in acoustical pressure to actuate their sensitive element, they themselves cause a disturbance in the medium with the result that they are less sensitive than is desirable. This is especially true for sound vibrations of relatively low frequency.

Most of the detecting devices of the prior art merely indicate that such a disturbance has occurred within a predetermined area and they fail to provide any indication of the direction from which the sound emanated. In order that an indication of direction be obtained, it is necessary to employ a plurality of such devices arranged in an array so as to produce outputs which can be employed to give an indication of direction.

I have invented a sonar transducer which is an improvement over sound-detecting devices of the prior art. My sonar transducer is more sensitive than are transducers of the prior art, particularly to sound of relatively low frequency. My transducer is responsive to a wider band of frequencies than are transducers of the prior art. I may readily arrange my device to detect a vector displacement of liquid in response to an acoustic vibration.

One object of my invention is to provide a sonar transducer which is more sensitive than are sound-detecting devices of the prior art.

Another object of my invention is to provide a sonar transducer which responds to a wider band of frequencies than do sound-detecting devices of the prior art.

Yet another object of my invention is to provide a sonar transducer which may readily be arranged to provide an indication of the vector displacement of a liquid in response to an acoustic vibration.

A still further object of my invention is to provide a sonar transducer which is compensated for changes in density of the liquid in which the transducer is placed.

Other and further objects of my invention will appear from the following description.

In general, my invention contemplates the provision of a sonar transducer in which a neutrally buoyant conductive member disposed in a liquid forms the common plate of two capacitors, the other plates of which are formed by meshes mounted in fixed positions adjacent the member. Upon the occurence of an acoustic disturbance in the medium, the member moves with the liquid to vary the relative capacitance of the two capacitors. I provide means for detecting the change in capitance to afford an indication of the acoustic disturbance in the medium. In one form of my invention, I provide such indications with reference to three mutually perpendicular axes and I add the resultant signals vectorially to obtain an indication of the vector displacement of the liquid. I may readily provide my sonar transducer with means for compensating for the effect of density changes in the liquid and for ocean currents or the like normally to hold the member in a neutral position in the absence of an acoustic disturbance in the liquid.

In the accompanying drawings, which form part of the instant specification, and which are to be read in conjunction therewith, and in which like reference numerals are used to indicate like parts in the various views;

FIGURE 2 is a schematic view of a second form of my sonar transducer.

Figure 1:
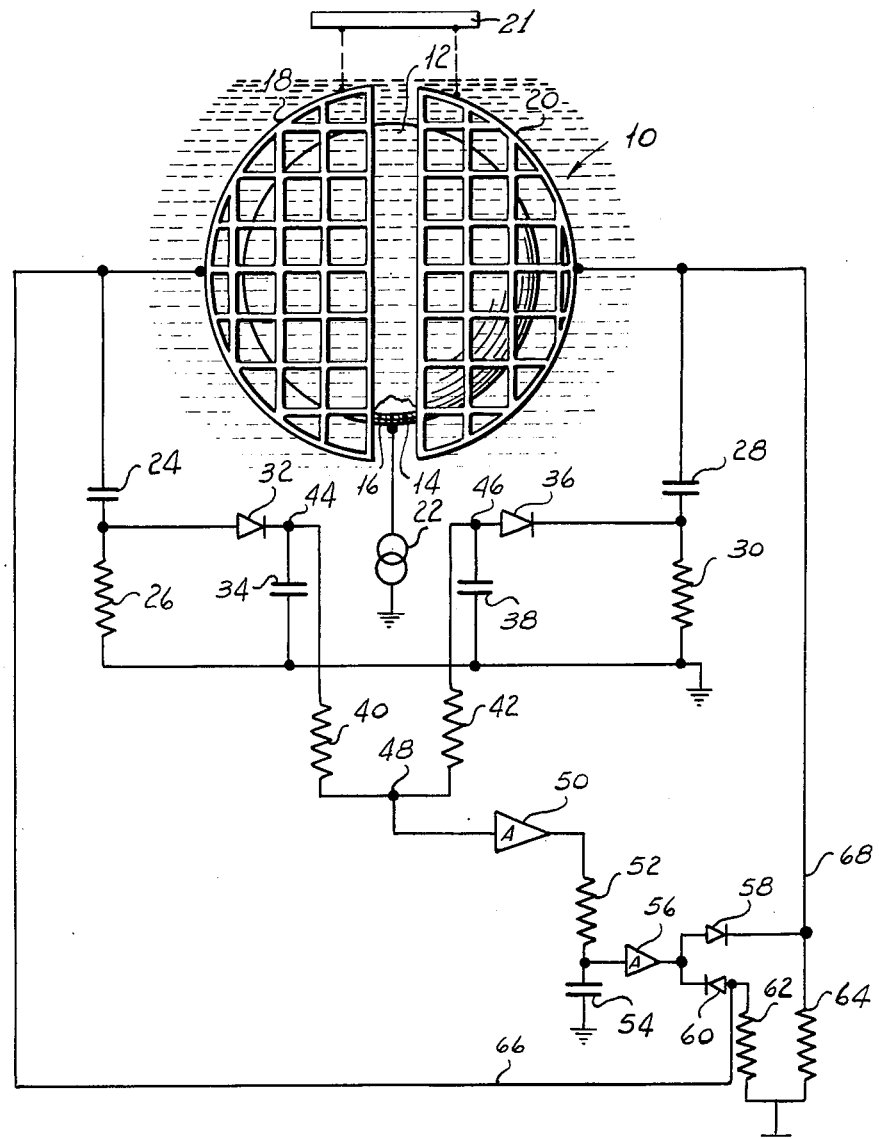
FIGURE 1 is a schematic view of one form of my sonar transducer.

Referring now to FIGURE 1 of the drawings, my sonar transducer, indicated generally by the reference character 10, includes a member such, for example, as a ball 12. I form the ball 12 from an inner shell 14 of any suitable material such, for example, as a plastic and coat the outer surface of the shell 14 with a coating 16 of a suitable conductive material. It is to be understood that in use of my transducer 10, the ball 12 is immersed in the liquid in which the acoustic disturbance to be detected occurs. I so construct the ball 12 by selecting the proper material and cross-sectional area of the ball as to produce a ball which is neutrally buoyant in the liquid in which it is immersed. As is known in the art, buoyancy depends also on second order effects such as temperature, salinity, and pressure. These effects can, however, be compensated for in a manner in which will be described hereinafter.

I arrange two generally hemispherical meshes 18 and 20 in fixed positions adjacent the ball 12 on any suitable support 21 as indicated schematically by the dot-dash lines in FIGURE 1. With this arrangement, it will be seen that the conductive coating 16 on the ball 12 provides a common plate for two capacitors, the other plates of which are formed by meshes 18 and 20 which are formed from a conductive material.

Although sea water is conductive, electromagnetic waves can be propagated over a short distance. It will readily be apparent that since the ball 12 is neutrally buoyant with respect to the water in which it is immersed and since it is free to move when an acoustic disturbance is propagated in the liquid, then the ball 12 moves with the liquid to produce a change in the relative capacitance of the capacitors provided by mesh 18 and ball 12 and by mesh 20 and ball 12. I provide my transducer with means for detecting this variation in relative capacitance. I connect a source 22 of an electrical signal of suitable frequency between ground and the conductive coating 16. I connect a first filter circuit including a capacitor 24 and a resistor 26 in series between plate 18 and ground. I connect a second filter circuit including a capacitor 28 and a resistor 30 between the mesh 20 and ground. The arrangement of these circuits is such that a signal of the frequency of the source 22 is developed across each of the resistors 26 and 30. It will readily be appreciated that when an acoustic disturbance moves the ball 12, these signals will be modulated in accordance with the acoustic disturbance causing the movement of the ball. A diode 32 and capacitor 34 connected across the resistor 26 cause the capacitor to charge during positive half cycles of the carrier signal. A diode 36 and a capacitor 38 connected in series across the resistor 30 permit capacitor 38 to charge during negative half cycles of the potential across resistor 30. I connect a pair of resistors 40 and 42 in series between the common terminal 44 of diode 32 and capacitor 34 and the common terminal 46 of diode 36 and capacitor 38. From the arrangement just described, it will be seen that where there is no acoustic disturbance acting on the ball 12, the potential developed across capacitor 34 equals the potential developed across capacitor 38 and the common terminal 48 is substantially at ground potential. When, however, there is an acoustic disturbance acting on the ball 12, then the arrangement generates a potential at the terminal 48, which is a measure of the disturbance causing the movement of the ball 12.

It will readily be apparent that the arrangement thus far described indicates displacement of the ball 12 and thus acoustic disturbances producing the displacement in the direction of an axis which is perpendicular to the planes in which the ends or peripheral edges of meshes 18 and 20 lie. I have provided my system with means for causing the ball 12 to operate from a null position at which it is disposed centrally of the two meshes 18 and 20. I connect an amplifier 50 having substantially unity gain between the common terminal 48 and a series circuit including a resistor 52 and a filtering capacitor 54. A second amplifier 56 connected to the common terminal of resistor 52 and capacitor 54 amplifies the signal. I connect respective oppositely biased diodes 58 and 60 in series with resistors 62 and 64 between the output terminal and amplifier 56 and ground. Conductors 66 and 68 connect the common terminals of diodes 58 and 60 and resistors 62 and 64 to the meshes 18 and 20 to apply such potentials to the meshes as will cause the ball 12 normally to occupy its neutral position with respect to the meshes under the action of the electrostatic forces between the ball 12 and the meshes 18 and 20. It will readily be appreciated that upon the occurrence of a disturbance ball 12 will be displaced from its neutral position to generate a signal as described above.

Referring now to FIGURE 2, I have shown an alternate form of my invention in which my transducer senses movement of the neutrally buoyant ball 12 with reference to three mutually perpendicular axes. In this form of my transducer, a first set of meshes 70 and 72 sense movement of the ball in the direction of what may be termed a lateral axis. A second set of meshes 74 and 76 detect movement of the ball 12 with reference to a fore-and-aft axis while a third set of meshes, only one mesh 78 of which is shown in the figure, detect movement of the ball with reference to a vertical axis. Meshes 70, 72, 74, 76 and 78 are carried by a support 79 as indicated schematically by the dot-dash lines in the figure. It will readily be apparent from the description of FIGURE 1 that when the ball 12 moves under the influence of an acoustic disturbance with reference to any one of the three axes with reference to which the three sets of meshes are oriented in FIGURE 2, the relative capacitance of the two capacitors formed by the ball and by the sets of plates in this form of my invention varies. I provide the form of my invention shown in FIGURE 2 with means for vectorially adding the signals resulting from displacement of the ball 12 with reference to the three axes in the form of my invention shown in FIGURE 2 to obtain a representation of the azimuth, the elevation angle and the magnitude of the acoustic disturbance producing displacement of the ball. As in the form of my invention shown in FIGURE 1, I connect a source 80, of a voltage at carrier frequency between ball 12 and ground. Respective conductors 82 and 84 connect the meshes 70 and 72 to the input terminals of a differential amplifier 86 of any suitable type known to the art to cause the amplifier to produce an output signal which is a measure of the variation in relative capacitance of the capacitators formed by mesh 70 and ball 12 and by mesh 72 and ball 12. Respective conductors 88 and 90 connect the meshes 74 and 76 to the input terminals of a second differential amplifier 92 to cause the amplifier 92 to produce an output signal which indicates the variation in relative capacitance and thus the motion of the ball 12 in fore-and-aft axis as a result of the acoustic disturbance. I apply the output of amplifier 86 to a summing amplifier 94. A network 96 adapted to introduce a fixed phase shift of 90 degrees into the output of the amplifier 92 couples the signal from amplifier 92 to the summing amplifier 94. It will be seen that the output of the summing amplifier 94 includes a component which is a measure of the azimuth of the acoustic disturbance producing the movement of ball 12. An amplifier 97 and a limiter 98 apply the output signal from amplifier 94 to a wide band phase detector 100, the output of which passes through a filter including a resistor 102 and a capacitor 104 connected to ground to produce a signal at an output terminal 106 which represents the azimuth of the acoustic disturbance producing the motion of the ball 12.

Respective conductors 106' and 108 connect the mesh 78 and the mesh forming a pair with mesh 78 to the input terminals of a differential amplifier 110 which produces an output signal representing the displacement of the ball 12 in the direction of a vertical axis. I apply the output of the amplifier 110 to a variable phase shifter 112, the output of which is applied to an input terminal of a summing amplifier 114. A conductor 116 connects the output of the phase shifter 112 to a nulling phase detector 118 and a conductor 120 applies the output of summing amplifier 94 to the other input terminal of the nulling phase detector 118. The operation of the nulling phase detector 118 is such that its output is zero if the two inputs on conductors 116 and 120 are 90 degrees out of phase. An amplifier 122 applies the output of the nulling phase detector 118 to the control input terminal of the phase shifter 112. In this manner, I ensure that the output of the phase shifter 112 always is in quadrature phase relationship to the signal on conductor 120. I apply this latter signal to the other input terminal of the summing amplifier 114. As a result of this operation, I ensure that the I add the vectorial sum of the fore-and-aft and lateral components carried by conductor 120 with the vertical component carried by conductor 116. As a result of this operation, the output of the summing amplifier 114 at all times is the vector sum of the respective displacements with reference to the three mutually perpendicular axes along which the respective pairs of plates of the form of my invention shown in FIGURE 2 are arranged. I apply the signal on conductor 120 and the signal output of amplifier 114 to a phase detecting network 124, the output of which passes through a filter including a resistor 126 and a capacitor 128 connected to ground to an output terminal 130 to give a measure of the elevation angle of the resultant movement of the ball 12 in response to an acoustic disturbance.

A diode 132 applies the output of summing amplifier 114 to an output terminal 134 to produce a potential at this terminal which is proportional to the magnitude of the acoustic disturbance. A filter including a resistor 136 and a capacitor 138 connected between terminal 134 and ground filters out undesirable variations in this output potential.

I provide the form of my invention shown in FIGURE 2 with means for maintaining the ball 12 at a location at which the ball is substantially centrally located with reference to the pairs of meshes. I connect a resistor 140 and a filter circuit including a parallel connected capacitor 142 and inductor 144 having a high Q value between the output of amplifier 86 and ground. I apply the carrier source signal and the signal at the common terminal of resistor 140 and capacitor 142 to the respective inputs of a phase sensitive demodulator 146 whereby the phase sensitive demodulator produces an output potential, the polarity and the magnitude of which represent any steady state displacement of the ball 12 from its neutral position such as may be the result of an ocean current or the like. I apply the output of demodulator 146 to a pair of oscillators so that an output of one polarity turns one of the oscillators on while an output of the other polarity turns the other one of the oscillators on. I connect the oscillators 148 and 150 respectively to coils 152 and 154 carried by the meshes 70 and 72. As a result of this application of signals to the coils 152 and 154, eddy currents are generated in the conductive coating on the ball 12 to produce electromagnetic forces which tend to return the ball 12 to its neutral position with respect to the lateral axis.

I connect the common terminal of a resistor 156 and a high Q filter circuit indicated generally by the reference character 158 connected in series between the output terminal of amplifier 92 and ground to one input terminal of a phase sensitive demodulator 160, the other input terminal of which is supplied with the signal from source 80. I apply the output of the demodulator 160 to oscillators 162 and 164 in such manner that a signal of one polarity turns one of the oscillators on and a signal of the other polarity turns the other oscillator on. I apply the oscillator outputs to respective restoring coils 166 and 168 carried by meshes 74 and 76 to hold the ball 12 in its neutral position with reference to the fore-and-aft axis. In a similar manner, I connect the common terminal of a resistor 170 and a high Q filter network indicated generally by the reference character 172 to one input terminal of phase sensitive demodulator 174, the other terminal of which is connected to the source 80. I apply the output of demodulator 174 to oscillators 176 and 178 in such manner that signals of opposite polarity turn the respective oscillators on. The oscillators 176 and 178 respectively supply a coil 180 on mesh 78 and another restoring coil carried by the mesh associated with mesh 78. In this manner, I cause the ball 12 normally to occupy the central position with respect to the meshes to account for displacements which otherwise might be introduced by eddy currents, by changes in density of the liquid, and the like.

In operation of the form of my invention shown in FIGURE 1, upon the occurrence of an acoustic disturbance, ball 12 moves with the liquid in which it is immersed to produce a change in the relative capacitance of the capacitor formed by mesh 18 and by ball 12 and the capacity of the capacitor formed by ball 12 and mesh 20. As a result of this change in relative capacitance, a potential is developed at terminal 48 which gives a measure of the amount of the displacement. This signal is amplified by the amplifier 50 and may thence be fed to any suitable indicating or recording device. If there exists a potential at the common terminal of resistor 52 and capacitor 54 as a result of a constant displacement of the ball 12 under the action of an ocean current or the like, diodes 58 and 60 feed a potential to the meshes 18 and 20 to cause the electrostatic forces to keep the ball 12 in a central position with reference to the meshes.

The form of my invention shown in FIGURE 2 operates in a manner similar to that outlined in connection with FIGURE 1, with the exception that it provides signals with reference to three mutually perpendicular axes. The circuitry shown in FIGURE 2 vectorially adds the displacement generated signals to produce outputs representing the azimuth angle, the elevation angle and the magnitude of the acoustic disturbance.

It will be seen that I have accomplished the objects of my invention. I have provided a sonar transducer which is more sensitive to acoustic disturbances than are sound-detecting devices of the prior art. My sonar transducer does not depend for its operation directly on variations in pressure in the medium in which it is used. My transducer responds to a wider band of frequencies than do transducers of the prior art. I may readily arrange my transducer to afford an indication of the vector displacement of liquid in response to an acoustic disturbance.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A transducer for detecting acoustic disturbances in a fluid including in combination a first member, means positioning said first member in said fluid, a second member supported by said fluid adjacent said first member and neutrally buoyant with respect to said fluid, said second member displacing a mass of said fluid substantially equal to the mass of said second member, said second member being free to move with respect to said first member in response to an acoustic disturbance and means responsive to relative movement between said members under the influence of an acoustic disturbance for producing an indication of said disturbance.

2. A transducer for detecting acoustic disturbances in a fluid including in combination a pair of elements, means positioning said elements in spaced relationship in said fluid, a member neutrally buoyant with respect to said fluid and supported by said fluid in the space between said elements, said member displacing a mass of said fluid substantially equal to the mass of said member, said member being free to move with respect to said elements in response to an acoustic disturbance in the fluid and means responsive to relative motion between said member and said elements for producing an indication of an acoustic disturbance.

3. A transducer for detecting acoustic disturbances in a fluid including in combination a capacitor element, means positioniing said element in said fluid, a member neutrally buoyant with respect to said fluid and supported by the fluid adjacent said fixed capacitor element, said member displacing a mass of said fluid substantially equal to the mass of said member, said member being free to move with respect to said element in response to an acoustic disturbance in the fluid, said member being formed at least in part of conductive material so that said member and said element comprise a capacitor, means for applying an electrical signal across said capacitor and means responsive to a change in capacitance of said capacitor in response to displacement of said member under the action of an acoustic disturbance in said fluid for indicating the presence of said disturbance.

4. A transducer for detecting an acoustic disturbance in a fluid including in combination means providing a pair of capaictor elements, means mounting said elements in spaced relationship in said fluid, a member neutrally buoyant with respect to said fluid and supported by said fluid between said elements, said member displacing a mass of said fluid substantially equal to the mass of said member, said member being free to move with respect to said elements in response to an acoustic disturbance in the fluid, said member being formed at least in part of conductive material so that said member and said elements comprise a pair of capacitors, means for applying an electrical signal to said capacitors and means responsive to displacement of said member under the action of an acoustic disturbance in the fluid for producing a signal indicating the acoustic disturbance.

5. A sonar transducer for detecting an acoustic disturbance in a fluid including in combination a pair of capacitor plates, means mounting said plates in spaced relationship in said fluid, a ball neutrally buoyant with respect to said fluid supported by the fluid between the plates, said ball displacing mass of said fluid substantially equal to the mass of said ball, said ball being free to move with respect to said plates in response to an acoustic disturbance in the fluid, said ball being formed at least in part of conductive material so that the ball and the plates comprise a pair of capacitors and means responsive to displacement of said ball under the action of an acoustic disturbance in said fluid for producing a signal indicating the change in relative capacitance of said capacitors as an indication of the presence of said acoustic disturbance.

6. A sonar transducer for detecting an acoustic disturbance in a fluid including in combination a pair of curved capacitor plates, means mounting said plates in spaced relationship in said fluid, a ball neutrally buoyant with respect to said fluid supported by the fluid between the plates, said ball displacing a mass of said fluid substantially equal to the mass of said ball, said ball being free to move with respect to said plates in response to an acoustic disturbance in the fluid, a coating of conductive material carried by said ball so that the ball and the plates comprise a pair of capacitors, means for applying an electrical signal to said capacitors and means responsive to displacement of said ball in response to an acoustic disturbance in the fluid for producing an electrical signal indicating the presence of said disturbance.

7. A transducer as in claim 6 in which said curve capacitor plates are formed with openings permitting free flow of the circumambient fluid.

8. A sonar transducer for detecting an acoustic disturbance in a fluid including in combination a pair of curved capacitor plates, means mounting said plates in spaced relationship in said fluid, a ball neutrally buoyant with respect to said fluid supported by said fluid between said plates, said ball displacing a mass of said fluid substantially equal to the mass of said ball, said ball being free to move with respect to said plates in response to an acoustic disturbance in the fluid, said ball being formed at least in part of conductive material so that the ball and the plates comprise a pair of capacitors, means responsive to displacement of said ball in response to an acoustic disturbance in the fluid for producing a signal indicating the presence of said disturbance, said ball being adapted to occupy a neutral position between said capacitor plates and means responsive to a steady state disturbance of said fluid for urging said ball to said neutral position.

9. A sonar transducer for detecting an acoustic disturbance in a fluid including in combination three pairs of capacitor plates, means mounting said plates in spaced relationship in said fluid with the respective pairs of plates oriented to three mutually perpendicular axes, a member neutrally buoyant with respect to said fluid supported by said fluid between the plates of said pairs, said member displacing a mass of said fluid substantially equal to the mass of said member, said member being free to move with respect to said plate in response to an acoustic disturbance in the fluid, said member being formed at least in part of conductive material so that said member and said plates comprise three pairs of capacitors, means for applying an electrical signal to each pair of capacitors and means responsive to displacement of said member in response to an acoustic disturbance in the fluid for producing a signal representing the magnitude and direction of said acoustic disturbance.

10. A sonar transducer for detecting an acoustic disturbance in a fluid including in combination three pairs of capacitor plates, means mounting said plates in spaced relationship in said fluid with the respective pairs of plates oriented to three mutually perpendicular axes, a member neutrally buoyant with respect to said fliud supported by said fluid between the plates of said pairs, said member displacing a mass of said fluid substantially equal to the mass of said member, said member being free to move with respect to said plates in response to an acoustic disturbance in the fluid, said member being adapted to occupy a neutral position with respect to said plates, said member being formed at least in part of conductive material so that said member and said plates comprise three pairs of capacitors, means for applying an electrical signal to each pair of capacitors, means responsive to displacement of said member in response to an acoustic disturbance in said fluid for producing a signal representing the magnitude and direction of said acoustic disturbance and means responsive to a steady state displacement of said fluid for urging said member to said neutral position.

References Cited by the Examiner

UNITED STATES PATENTS

| | | | |
|---|---|---|---|
| 2,472,107 | 6/49 | Hayes et al. | 340—8 |
| 2,825,978 | 3/58 | Davis | 317—246 |
| 2,910,869 | 11/59 | Anderson | 317—246 |
| 3,073,550 | 1/63 | Young | 244—14 |

CHESTER L. JUSTUS, *Primary Examiner.*

KATHLEEN H. CLAFFY, FREDERICK M. STRADER,
*Examiners.*

UNITED STATES PATENT OFFICE
CERTIFICATE OF CORRECTION

Patent No. 3,208,037					September 21, 1965

Leo Botwin

It is hereby certified that error appears in the above numbered patent requiring correction and that the said Letters Patent should read as corrected below.

Column 6, line 30, for "positioniing" read -- positioning --; line 32, strike out "fixed"; same column 6, line 65, before "mass" insert -- a --.

Signed and sealed this 5th day of April 1966.

(SEAL)
Attest:

ERNEST W. SWIDER			EDWARD J. BRENNER
Attesting Officer			Commissioner of Patents

UNITED STATES PATENT OFFICE
CERTIFICATE OF CORRECTION

Patent No. 3,208,037 September 21, 1965

Leo Botwin

It is hereby certified that error appears in the above numbered patent requiring correction and that the said Letters Patent should read as corrected below.

Column 6, line 30, for "positioniing" read -- positioning --; line 32, strike out "fixed"; same column 6, line 65, before "mass" insert -- a --.

Signed and sealed this 5th day of April 1966.

(SEAL)
Attest:

ERNEST W. SWIDER
Attesting Officer

EDWARD J. BRENNER
Commissioner of Patents